United States Patent [19]
Brooks

[11] Patent Number: 5,607,496
[45] Date of Patent: Mar. 4, 1997

[54] REMOVAL OF MERCURY FROM A COMBUSTION GAS STREAM AND APPARATUS

[75] Inventor: Richard J. Brooks, Seattle, Wash.

[73] Assignee: Brooks Rand, Ltd., Seattle, Wash.

[21] Appl. No.: 496,304

[22] Filed: Jun. 29, 1995

Related U.S. Application Data

[63] Continuation-in-part of Ser. No. 252,188, Jun. 1, 1994, abandoned.

[51] Int. Cl.$^6$ .......................... B01D 50/00; B01D 53/64; C22B 43/00
[52] U.S. Cl. .......................... 75/670; 266/148; 422/171; 423/107; 423/210
[58] Field of Search .......................... 75/670; 423/107, 423/210; 422/170, 171, 177

[56] References Cited

U.S. PATENT DOCUMENTS 5,409,522  4/1995  Durham et al. .......................... 75/670

*Primary Examiner*—Melvyn Andrews
*Attorney, Agent, or Firm*—Marshall, O'Toole, Gerstein, Murray & Borun

[57] ABSTRACT in a hot combustion gas stream are removed therefrom by oxidizing the elemental mercury, to form a mercury compound, and adsorbing the mercury compounds on adsorbent particles such as activated alumina. Oxidation is catalytically promoted. After adsorbing a substantial quantity of mercury compounds, the spent adsorbent particles can be regenerated and re-used by heating the particles to decompose and drive off the mercury compounds. In another embodiment, oxidation of the elemental mercury is catalytically promoted at a catalyzing station, and the mercury compounds are removed from the gas stream by scrubbing.

64 Claims, 2 Drawing Sheets

REMOVAL OF MERCURY FROM A COMBUSTION GAS STREAM AND APPARATUS

RELATED APPLICATION

This is a continuation-in-part of application Ser. No. 08/252,188 filed Jun. 1, 1994 now abandoned and the disclosure thereof is incorporated herein by reference.

BACKGROUND OF THE INVENTION

The present invention relates generally to the removal of pollutants from a combustion gas stream, such as, for example, the combustion gas stream from a coal-burning power plant, from a sewage sludge combustion plant or from a garbage or waste material combustion plant, and more particularly to the removal of mercury from such a combustion gas stream.

The combustion gas stream from a coal-burning power plant is a major source of airborne mercury. Coal contains mercury sulfide which is decomposed to elemental mercury in the combustion boiler. Downstream of the boiler, in the ducts and smoke-stack of the combustion system, and then in the atmosphere, part of the elemental mercury is reoxidized, primarily to mercuric chloride ($HgCl_2$), by reacting with chloride ions or the like normally present in combustion reaction gases flowing through the combustion system of a coal-burning power plant.

A good-sized power plant will each day emit about a pound of mercury, as elemental mercury and mercury compounds. The concentration of mercury in the stream of combustion gas is about 7,000 $ng/m^3$.

Mercury compounds and elemental mercury escaping from the stack of a power plant are transported in the air, and eventually fall back to earth at various distances from the stack. When such a material reaches the aquatic system (streams, lakes and the like) some of it is methylated. The resulting methylated mercury compounds are readily incorporated into the aquatic food chain. There, the mercury level bioaccumulates in concentrations from one million to ten million times greater then the environmental concentration outside the aquatic food chain. Such concentrations of mercury are harmful to species in the aquatic food chain and also pose dangers to humans who consume the aquatic species.

Past efforts to remove mercury from the stream of combustion gas, before it leaves the stack of a power plant, include: (a) injection, into the combustion gas stream, of activated carbon particles or particulate sodium sulfide; and (b) flowing the combustion gas stream through a fixed bed of activated carbon particles.

When activated carbon particle injection is employed, the mercuric chloride in the gas stream is removed from the gas stream in a bag house and collected there as part of a powder containing other pollutants in particulate form. Mercuric chloride can be more readily removed from the gas stream at a bag house than can elemental mercury.

Sodium sulfide particle injection can be utilized to form mercuric sulfide (HgS) which is more readily removable from the gas stream at a bag house than is elemental mercury.

When the gas stream flows through a bed of activated carbon particles, mercury compounds are adsorbed on the surface of the activated carbon particles and remain there. Elemental mercury, usually present in vapor form in combustion gases, is not adsorbed on the activated carbon to any substantial extent without first being oxidized into a compound of mercury.

All of the expedients described in the preceding three paragraphs present solid waste disposal problems. The powders collected at the bag house, and the spent activated carbon removed from the bed of activated carbon, all contain mercury compounds and thus pose special problems with respect to burial at land fills where strictly localized containment of the mercury compounds is imperative. The concentration of mercury compounds in powder collected from a bag house is relatively minute; therefore, a very small quantity of mercury would be dispersed throughout relatively massive volumes of land fill, wherever the bag house powder is dumped. Moreover, with respect to activated carbon, that material is relatively expensive, and once spent activated carbon particles are removed from an adsorbent bed, they cannot be easily regenerated and used again.

Another expedient for removing mercury compounds from a stream of combustion gas involves the use of scrubbers. Mercury compounds are normally present in the combustion gas stream as vapors which can be removed from the gas stream by directing the stream through a scrubber where the mercury compounds are incorporated into a scrubbing solution. Spent scrubbing solution is withdrawn from the scrubber and has a relatively large liquid volume with only traces of mercury compounds therein; these compounds must be removed from the spent scrubbing solution before the waste liquid from this solution can be released into the environment. Removing traces of mercury compounds from large volumes of spent scrubbing solution is expensive and not commercially practical.

A drawback to all of the expedients described above is that they remove from the gas stream substantially only mercury compounds. A substantial part, if not most, of the elemental mercury in the gas stream remains unoxidized and, as such, is not removed by any of these expedients.

A further expedient employs a combination of sulfur and activated carbon particles; the sulfur chemically bonds with elemental mercury vapor forming mercuric sulfide which remains on the activated carbon particles. Sulfur impregnated alumina particles have also been employed; the sulfur reacts with elemental mercury vapor to form mercuric sulfide which remains on the alumina particles.

SUMMARY OF THE INVENTION

The present invention is directed to a method and apparatus for removing, from a combustion gas stream, elemental mercury and mercury compounds, without the drawbacks and disadvantages of the prior art expedients discussed above. In one embodiment, the combustion gas stream is flowed through a bed of adsorbent particles, preferably activated alumina particles. Mercury compounds in the gas stream will be adsorbed and retained on the surface of activated alumina particles, but much of the elemental mercury will not be so affected. In the present invention, at least most of the elemental mercury in the combustion gas stream is oxidized to form mercury compounds (e.g. mercuric chloride), and catalysts are employed to promote the oxidation process.

Some such catalysts are already present in the combustion gas stream; these, and other catalysts introduced from an external source, may be employed in a separate catalyzing step performed at a location upstream of the bed of activated alumina particles, or a catalyzing agent may be incorporated into the bed containing the mass of activated alumina particles.

An important characteristic of activated alumina is that it has a very high ratio of surface to mass. An activated alumina particle has a very irregular surface characterized by peaks, valleys, fissures and the like. Therefore, a bed of activated alumina particles provides a very large surface on which mercury compounds are adsorbed, compared to a bed of particles having more regular surfaces. In addition, alumina itself can also act as a so-called "Lewis acid" (an electron acceptor). As such, it could itself facilitate the oxidation of elemental mercury adsorbed on the alumina particles and help maximize retention of the mercury on the mass of adsorbent, as a mercury compound. The properties of activated alumina particles described in all the preceding sentences of this paragraph will hereinafter be cumulatively referred to as "a catalytic activity for the oxidation of mercury".

Another important characteristic of activated alumina is that it is a ceramic (refractory) material which is sufficiently heat-resistant to accommodate a heating process for regenerating the activated alumina particles to remove the adsorbed mercury compounds therefrom. Regeneration is accomplished by heating the spent activated alumina particles to a temperature which is above both (1) the decomposition temperature of the mercury compounds and (2) the vaporization temperature of mercury. This drives off, as vapor, the mercury-containing materials adsorbed on the mass of activated alumina particles and enables one to re-use the activated alumina particles again to adsorb an additional substantial quantity of mercury compounds. The regeneration procedure described above can be repeated over and over again on spent activated alumina particles, thereby enabling re-use of the activated alumina particles time and time again.

The vapors of elemental mercury, driven off from the activated alumina particles during the regeneration procedure, can be condensed and recovered as elemental mercury, e.g., at a conventional mercury trap. Mercury, removed from the combustion gas stream and recovered in the manner described above, is highly concentrated in a relatively very small volume. This avoids the danger of widespread contamination of the environment, as in the case of very small concentrations of mercury compounds in massive volumes of bag house powder or spent scrubbing solution.

Activated alumina is the preferred adsorbent particulate material for use in the present invention. However, other adsorbent particulate materials may be utilized so long as they incorporate the above-described characteristics of activated alumina, namely: (i) a catalytic activity for the oxidation of mercury, at least substantially comparable to that of activated alumina particles; and (ii) sufficient heat resistance to accommodate a regeneration procedure of the type described two paragraphs above.

In another embodiment of the present invention, mercury compounds are removed from the combustion gas stream at a scrubber after the gas is flowed through a catalyzing station upstream of the scrubber. This catalytically promotes oxidation of elemental mercury in the gas stream so that substantially all the mercury in the gas stream is present as mercury compounds when the gas stream enters the scrubber which can remove mercury compounds, but not elemental mercury, from the gas stream.

Other features and advantages are inherent in the method and apparatus claimed and disclosed or will become apparent to those skilled in the art from the following detailed description in conjunction with the accompanying diagrammatic drawing.

DETAILED DESCRIPTION

Figure 1:
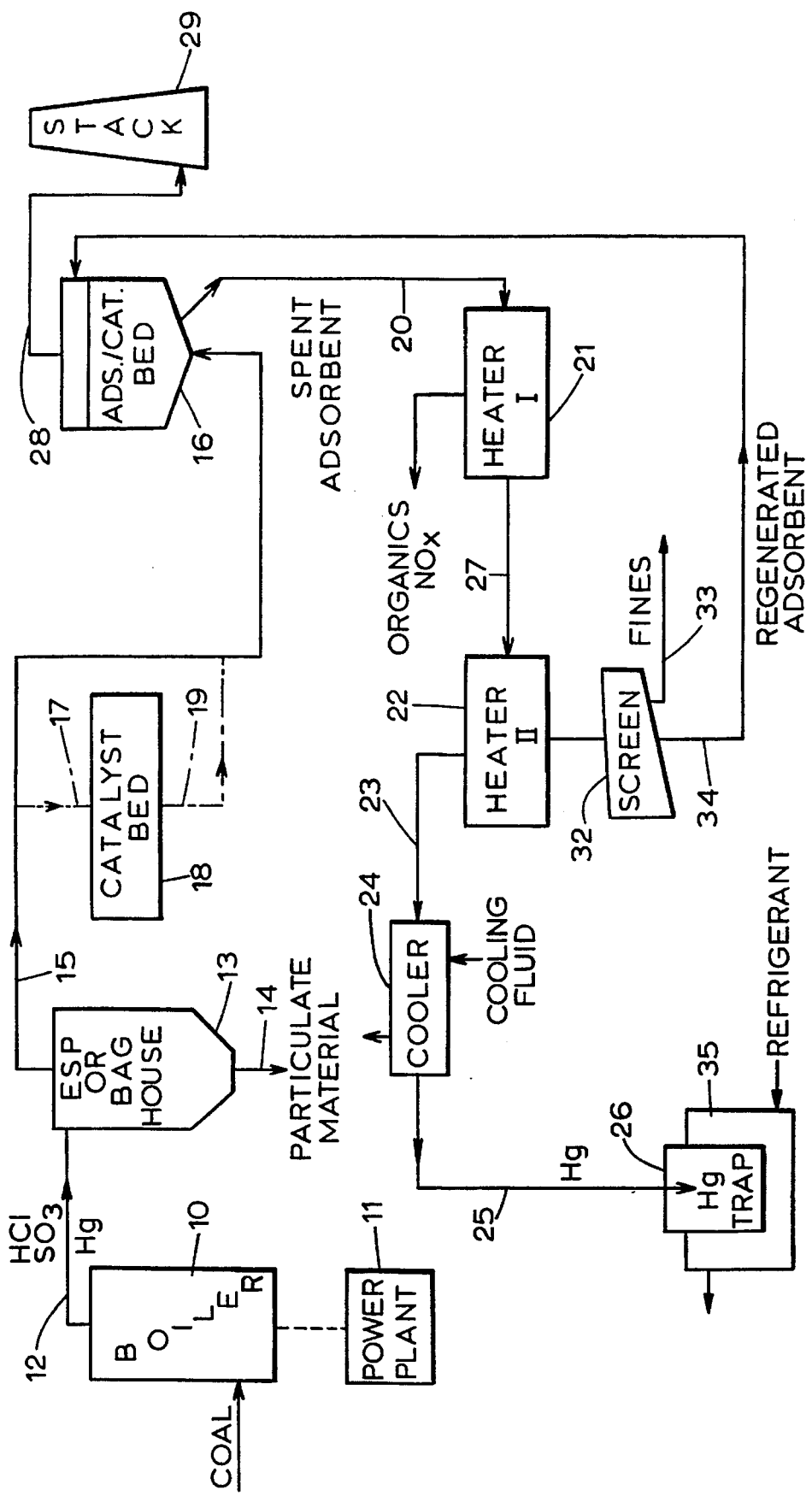
FIG. 1 is a flow diagram illustrating an embodiment of a method and apparatus in accordance with the present invention.

Referring to FIG. 1, coal is introduced into a boiler 10 associated with a power plant 11. The coal is combusted in boiler 10, and the heat from the combustion reaction is used to form steam which drives turbines at power plant 11 to generate electricity.

A hot stream of combustion gas is withdrawn from boiler 10 through duct 12. This stream contains particulate material, such as fly ash which is removed at a particle removal device 13 which may be an electrostatic precipitator (ESP) or a bag house, both of which are conventional expedients for removing particulate material from a combustion gas stream. Particulate material collected at 13 is removed at 14.

The temperature of the combustion gas stream downstream of boiler 10 is typically in the range 150°–200° C. At this temperature, the stream typically contains, among other things, vapors of mercury compounds, of elemental mercury, of acids such as hydrochloric acid (HCl) and of water ($H_2O$); the stream may contain gases such as $NO_x$, sulfur dioxide ($SO_2$) and sulfur trioxide ($SO_3$). The $H_2O$ vapor may react with the $NO_x$ and $SO_3$ in the gas stream to produce nitric and sulfuric acids.

Downstream of particle removal device 13, the stream of combustion gas flows through a duct 15. In accordance with the present invention, vapors of mercury compounds and of elemental mercury are removed from the stream by employing a bed 16 of adsorbent particles. Bed 16 may be a fixed bed or a fluidized bed. A fixed bed is preferred.

Also in accordance with the present invention, the elemental mercury vapor contained in the combustion gas is oxidized to produce therefrom at least one compound of mercury. Oxidation of the elemental mercury vapor in the stream of combustion gas is desirable because vapors of mercury compounds are much more readily adsorbed on the absorbent particles than is elemental mercury vapor. The oxidizing step may be performed upstream of bed 16, or at bed 16.

The stream of combustion gas, containing vapors of mercury compounds, is directed by duct 15 into the mass of adsorbent particles at bed 16. These adsorbent particles are adsorbent to (a) the mercury compounds originally contained in the combustion gas exiting boiler 10 at duct 12 and (b) the mercury compound produced by the oxidizing step. At bed 16, the mercury compounds described in the preceding sentence are adsorbed on the mass of adsorbent particles. The stream of combustion gas, from which mercury compounds have been removed at bed 16, flow from bed 16 through a duct 28 to a smoke-stack 29 which directs the gas out of the combustion system and into the outside atmosphere. The oxidizing and adsorbing steps are performed upstream of stack 29.

Eventually, after a substantial quantity of mercury compounds has been adsorbed on the mass of adsorbent particles at bed 16, the particles become spent. The spent particles are removed from bed 16 and subjected to heating in a series of heaters 21, 22. At heater 22, the spent particles are heated to an elevated temperature above the decomposition temperature of the adsorbed mercury compounds, a temperature which is also above the vaporization temperature of mercury. This drives off, from the adsorbent particles, the constituents of the decomposed mercury compounds, including elemental mercury vapor. What remains is a mass of regenerated adsorbent particles which can be returned to bed 16 for re-use to adsorb an additional substantial quantity of mercury compounds. After being driven off from the adsorbent particles, the elemental mercury vapor is cooled at a cooler 24 to condense the vapor which is then collected at a mercury trap 26.

The oxidizing step will now be discussed in more detail. The oxidizing agent can be a compound already present in the stream of combustion gas, it can be added to the stream of combustion gas upstream of bed 16, it can be combined with the mass of adsorbent particles in bed 16, or one can employ any combination of the above. The hydrochloric acid normally present in the stream of combustion gas will oxidize elemental mercury vapor to form a mercury compound (e.g. $HgCl_2$). Nitric and sulfuric acids, which may be present in the combustion gas stream as combustion reaction products, can oxidize elemental mercury vapor to form mercury compounds. Elemental mercury vapor can also be oxidized by $NO_x$ and $SO_3$, which may be present in the stream of combustion gas as combustion reaction products, or in the case of $SO_3$, may be formed in the combustion gas by the catalytically enhanced oxidation of $SO_2$, a precursor combustion reaction product.

In power plants employing low sulfur coal, and utilizing an electrostatic precipitator (ESP) to remove fly ash, it is oftentimes necessary to inject $SO_3$ into the stream of combustion gas upstream of the ESP in order to efficiently collect fly ash at the ESP. The $SO_3$ thus injected will oxidize elemental mercury vapors to form a mercury compound. Similarly, hydrochloric acid (HCl) may be injected into the stream of combustion gas to oxidize elemental mercury vapors to form a mercury compound. Additional expedients for oxidizing elemental mercury vapors upstream of bed 16 include the use of ultra-violet light, and the introduction of other chemicals which are oxidizing to elemental mercury.

In all instances described above, the oxidizing step is promoted by the employment of a catalyst. At least some of the catalyst is present in the stream of combustion gas as a carry-over from the combustion fuel (i.e. the coal). More particularly, the stream of combustion gas contains oxides of heavy metals some of which are present in relatively high concentrations and could likely act as catalysts for the oxidation of elemental mercury vapor. The most likely candidates are the oxides of the following heavy metals: manganese, vanadium, lead, chromium, iron, cobalt, nickel and selenium.

In addition to utilizing a carry-over catalyst as described above, one may also incorporate a catalyst into the mass of adsorbent particles at bed 16, or one may employ a catalyst bed 18 located upstream of bed 16 and downstream of combustion reaction boiler 10. Catalyst bed 18 is associated with an inlet duct 17 and an outlet duct 19. The catalyst employed at catalyst bed 18, or combined with the mass of adsorbent particles at bed 16, can be any catalyst heretofore utilized for the oxidation of elemental mercury vapor to form a compound of mercury. Likely candidates include oxides of manganese, vanadium, chromium, lead and selenium, for example.

When the catalyst is combined with the mass of adsorbent particles at 16, those particles act as the carrier for the catalyst. The high surface to volume ratio and other previously described properties of the adsorbent particles enhances the oxidation-promoting effect of the catalysts. More particularly, some elemental mercury and some oxidizer (the reactants) are adsorbed on the surface of the adsorbent particles where, among other things, the reaction between the two reactants has a longer time to occur within that part of the combustion system upstream of duct 28 than when the two reactants are merely dispersed in a gaseous phase in that part of the combustion system. When the reaction occurs downstream of bed 16, the mercury is lost to the outside environment, which is undesirable. The incorporation of catalyst into the adsorbent particles at bed 16 increases the reaction rate there and decreases the amount of mercury lost to the outside environment. Expedients which increase the time in which the reaction can occur upstream of duct 28, or which increase the reaction rate upstream of duct 28, will decrease the amount of mercury which is lost to the outside environment. These expedients can include a separate catalyst bed at 18, an adsorbent bed at 16 and incorporation of the catalyst into the adsorbent particles at bed 16. Normally, it takes only a few seconds for the combustion gas stream to flow from boiler 10 to stack 29.

When the catalyst is employed at catalyst bed 18, the carrier for the catalyst may be any conventional carrier heretofore employed as such. Catalyst carriers can include activated alumina, silica gel, mixtures of activated alumina and silica gel, mixtures or silica gel and magnesia, activated clays and mixtures of silica gel, magnesia and an activated clay. The catalyst carrier has a very large surface to mass ratio, akin to that of the adsorbent particles. The supplier of the catalyst for bed 18 can probably recommend the most appropriate carrier for the catalyst.

Typically, the catalyst is very finely divided, compared to the catalyst carrier material. In one embodiment, a mixture of catalyst and carrier material can be pelletized to form pellets which are extremely porous and which contain very fine particles of catalyst (e.g. a few microns in diameter) dispersed within a matrix of carrier material; the pellet typically has a cross-sectional dimension of ¹⁄₁₆ to ⅛ inch (1.59–3.17 mm). Pellets of catalyst admixed with activated alumina, for example, may be employed at adsorbent bed 16 when that bed contains a combination of catalyst and adsorbent particles.

Referring again to adsorbent bed 16, the adsorbent particles employed there are preferably activated alumina. These adsorbent particles typically have a surface to mass ratio of at least 175 $m^2/g$, preferably in the range of about 220 to about 600 $m^2/g$. The particles are sufficiently heat-resistant to accommodate the regeneration procedure performed at heater 22. More particularly, the particles are heat-resistant to an elevated temperature above the decomposition temperature of the adsorbed mercury compounds (e.g. a temperature above about 600° C.); and the particles are heat-resistant to a temperature which (a) produces elemental mercury vapor in the course of decomposing the mercury compounds and (b) drives off the elemental mercury vapor from the adsorbent particles (e.g. a temperature above about 700° C.).

The bed of activated alumina is devoid of elemental sulfur so that the adsorbing step is conducted in the absence of elemental sulfur. Typically, the activated alumina particles have an average particle size in the range of about 8–14 mesh (1.41–2.38 mm), in one embodiment. Particles larger than 8-mesh (2.38 mm) may be employed inasmuch as activated alumina particles have such a high surface area to mass ratio. Particles smaller than 14 mesh (1.41 mm) may also be employed, so long as the particle size is not so fine as to cause dusting problems.

Other candidates for use as adsorbent particles in accordance with the present invention include silica gel, magnesia, activated clays and combinations of two or more of alumina, silica gel, magnesia and activated clays. To qualify for use as adsorbent particles in accordance with the present invention, the particles should satisfy two criteria: (i) they should have a catalytic activity for the oxidation of mercury, at least substantially comparable to that of activated alumina particles and (ii) they should be sufficiently heat-resistant to accommodate the regeneration procedure described above.

The adsorbing step at bed 16 is conducted at a temperature greater than 100° C. to prevent condensation at bed 16 of water vapor contained in the stream of combustion gas. The stream of combustion gas at adsorbent bed 16 is normally at a temperature in the range of about 150° C. to about 200° C. The temperature of the adsorbing step is therefore below that at which mercury compounds decompose.

The oxidizing step, whether performed upstream of bed 16 or at bed 16 is conducted at a temperature in the same range as that employed for the adsorbing step (e.g. about 150° C. to about 200° C.). Oxidation of elemental mercury vapor usually occurs more readily at comparatively high temperatures while adsorption of mercury compounds usually occurs more readily at comparatively low temperatures. The present invention employs expedients which accommodate both (a) the oxidation of elemental mercury and (b) the adsorption of mercury compounds to (c) the temperature range normally present in the combustion gas stream (i.e. 150°–200° C.).

As noted above, the stream of combustion gas entering adsorbent bed 16 through duct 15 may contain acids which have formed from the products of the combustion reaction at boiler 10. These acids may include nitric acid or sulfuric acid, for example. As noted above, the stream of combustion gas, from which mercury compounds have been removed at bed 16, flows from bed 16 through duct 28 to a smoke-stack 29 from which the gas stream is exhausted into the atmosphere. It is undesirable for the gases exhausted from stack 29 to contain acids because those acids will contribute to acid rain. Accordingly, one embodiment of the present invention incorporates, into the mass of adsorbent particles at bed 16, at least one agent for treating the acids in the combustion gas. This agent preferably is selected from the group comprising the carbonates and hydroxides of sodium, potassium and calcium, for example. The compounds described in the preceding sentence are chemical bases which neutralize the acids in the stream of combustion gas, forming salts which deposit on the mass of adsorbent particles at bed 16.

At the normal temperature range of the combustion gas stream (e.g. 150°–200° C.), the reactions forming the salts described in the preceding paragraph occur to a lesser extent than they do at higher temperatures. However, to the extent that such salts do form and deposit at bed 16, it is believed that they will aid in the adsorption of mercury compounds, compared to the adsorption which occurs in the absence of such salts.

Referring again to the procedure for regenerating spent adsorbent particles from bed 16, the spent particles are conveyed or transported from bed 16 to a first heater 21 by a conveying medium indicated representationally at 20 in FIG. 1. The adsorbent particles are heated at heater 21 to drive off, from the mass of adsorbent particles, residual volatile organic compounds and adsorbed oxides of nitrogen which are then collected by conventional expedients not part of the present invention. As an alternative, the volatile organic compounds and the oxides of nitrogen driven off from the adsorbent particles at first heater 21 can be returned to boiler 10, for example.

Following the heating step at first heater 21, the adsorbent particles are transferred to a second heater 22 via a transporting medium indicated representationally at 27 in FIG. 1. At second heater 22, the adsorbent particles are heated to a temperature which is above 600° C., to decompose the mercury compounds therein, and which is above 700° C. to drive off, as vapors, the elemental mercury vapor resulting from the decomposition of the mercury compounds.

The principal compound of mercury which is adsorbed on the adsorbent particles is mercuric chloride. This compound is volatile and decomposes to elemental mercury at a temperature in the range 600°–700° C., as do other mercury compounds which will be adsorbed on the adsorbent particles at bed 16 in a method in accordance with the present invention. At a temperature below that range, the mercury compounds will be driven off from the adsorbent particles as vapors of undecomposed mercury compounds. By heating to a temperature above 700° C., one assures that vapors of elemental mercury (rather than vapors of a mercury compound) are driven off; driving off vapors of elemental mercury is preferred because then one can recover elemental mercury by condensation. To the extent that salts of sulfuric and nitric acids have been deposited upon the adsorbent particles, these salts will probably be substantially decomposed and driven off during the heating step at second heater 22. If not, the adsorbent particles can be sprayed with water to dissolve and wash off the water soluble salts, and the wet, desalted adsorbent particles can then be dried with the hot combustion gas stream. As an alternative, undecomposed residual salts can be retained in place if they make a substantial contribution to enhancing the adsorption of mercury compounds. The spent chemical base which neutralizes the acids in the combustion gas stream can be periodically replenished. If the ratio of salts to adsorbent particles becomes too high, some of the adsorbent particles containing salt deposits can be replaced with fresh, unsalted adsorbent particles.

Following the heating step at second heater 22, the regenerated adsorbent particles are classified at a screen 32 where fines are removed at 33, and the screened, regenerated adsorbent particles are returned to bed 16 via a transporting medium indicated representationally at 34 in FIG. 1.

When bed 16 is a fluidized bed, spent adsorbent particles can be continuously or periodically withdrawn from bed 16, for regeneration, without shutting down the adsorption procedure at bed 16; concurrently, an equal amount of regenerated (or fresh) adsorbent particles can be added to the fluidized bed, as spent particles are withdrawn.

When bed 16 is a fixed bed, it can be used in tandem with another fixed bed through which the gas stream can be shunted when the first-mentioned fixed bed is removed from service for regeneration of the spent adsorbent particles. Alternatively, each of the two fixed beds can be mounted for periodic rotation, about a common vertical axis, between a first, adsorbing position in which the combustion gas stream is directed through the bed and a second non-adsorbing position which is displaced from the flow of the gas stream and at which spent adsorbent particle regeneration can be performed. When one fixed bed is at its first position, the other fixed bed will be at its second position. The two positions can be angularly spaced 180° apart, in which case each position can be occupied alternately in sequence by each of the two rotatably mounted, fixed beds.

The vapors of elemental mercury driven off from the adsorbent particles at second heater 22 are conducted by a line 23 to a cooler 24 through which a cooling fluid is circulated. The vapors are condensed at 24 and directed, per arrow 25, to a conventional mercury trap 26 maintained in a refrigerated environment 25, through which a refrigerant is circulated, for example. Mercury trap 26 may comprise a cold surface on which droplets of the condensed vapor are collected and from which they are directed into a chilled container. The mercury vapors condensed at cooler 24 and trapped at 26 are, of course, much more concentrated than the vapors of mercury and mercury compounds in the stream of combustion gas in duct 15. Cooler 24 and mercury trap 26 are maintained at a temperature in the range $-22°$ C. to $-40°$ C. The mercury thus condensed and trapped probably contains contaminants, but it can be purified and recycled for subsequent use by conventional mercury refining techniques.

In another embodiment, elemental mercury vapors from heater 22 can be collected in a trap employing gold-coated quartz sand particles or gold wool. When this trap becomes saturated with mercury, the gold wool or gold-coated quartz sand particles can be regenerated by heating these materials to a temperature which drives off the elemental mercury as vapors which can then be cooled, condensed and collected with apparatus similar to cooler 24 and refrigerated trap 26. In this embodiment, the trap employing the gold can function as an intermediate concentrator for the mercury vapors prior to final concentration at a refrigerated trap.

In another embodiment, a trap employing gold can be used in a clean-up step performed on the residual gas remaining after mercury vapors have been removed using cooler 24 and refrigerated trap 26.

As shown in FIG. 1, first and second heaters 21, 22 respectively are displaced from bed 16, as is cooler 24 and trap 26. Similarly, cooler 24 is displaced from first and second heaters 21, 22.

The regenerated adsorbent particles returned to bed 16 are re-used to remove from the stream of combustion gas both (a) the mercury compounds contained in the combustion gas as it exited boiler 10 and (b) the mercury compounds produced by the oxidizing step performed in accordance with the present invention.

All of the embodiments described above cause the mercury removed from the combustion gas stream to become concentrated in a mass occupying a relatively small volume which renders the mercury amenable to recovery and recycling for subsequent commercial use. On the other hand, if the mercury thusly removed from the combustion gas stream is to be treated as a waste material, it can be contained as such under conditions of very highly localized confinement. Distribution of mercury as waste in minute concentrations within massive volumes of other material, solid or liquid, is avoided. Contamination of the environment is also avoided.

When reference is made herein to the step of oxidizing the elemental mercury contained in the combustion gas, it includes, in its broadest sense, an oxidizing step performed solely by oxidizing agents (a) already present in the combustion gas, as combustion reaction products and/or (b) heretofore added for some other purpose (such as helping to remove fly ash). Similarly, when reference is made herein to a catalyst employed to promote the oxidizing step, it includes, in its broadest sense, one or more catalysts carried over from the combustion fuel. In such cases, (i) a mercury compound characterized herein as contained in the combustion gas could be the same as (ii) a mercury compound characterized herein as produced by the oxidizing step, and vice versa.

When reference is made herein to a combustion reaction product, it includes, in its broadest sense, a product, which was oxidized, in the presence of a carry-over catalyst, from a precursor combustion reaction product. An example would be the oxidation of sulfur dioxide (the precursor combustion reaction product) to sulfur trioxide, in the presence of manganese oxide (the carry-over catalyst).

In accordance with one embodiment of the present invention, the oxidizing step comprises supplemental oxidizing of elemental mercury. As used herein, supplemental oxidizing is oxidizing in addition to that due to the oxidizing agents described at (a) and (b) in the next to last paragraph. Supplemental oxidizing can employ either a carry-over catalyst, an externally introduced catalyst, or both; and supplemental oxidizing can be performed at bed 16, at bed 18 or both, for example. An embodiment without supplemental oxidizing of mercury includes the adsorbing step at bed 16, but there is no oxidizing step at 18 and no externally introduced oxidizing agent incorporated into bed 16.

Figure 2:
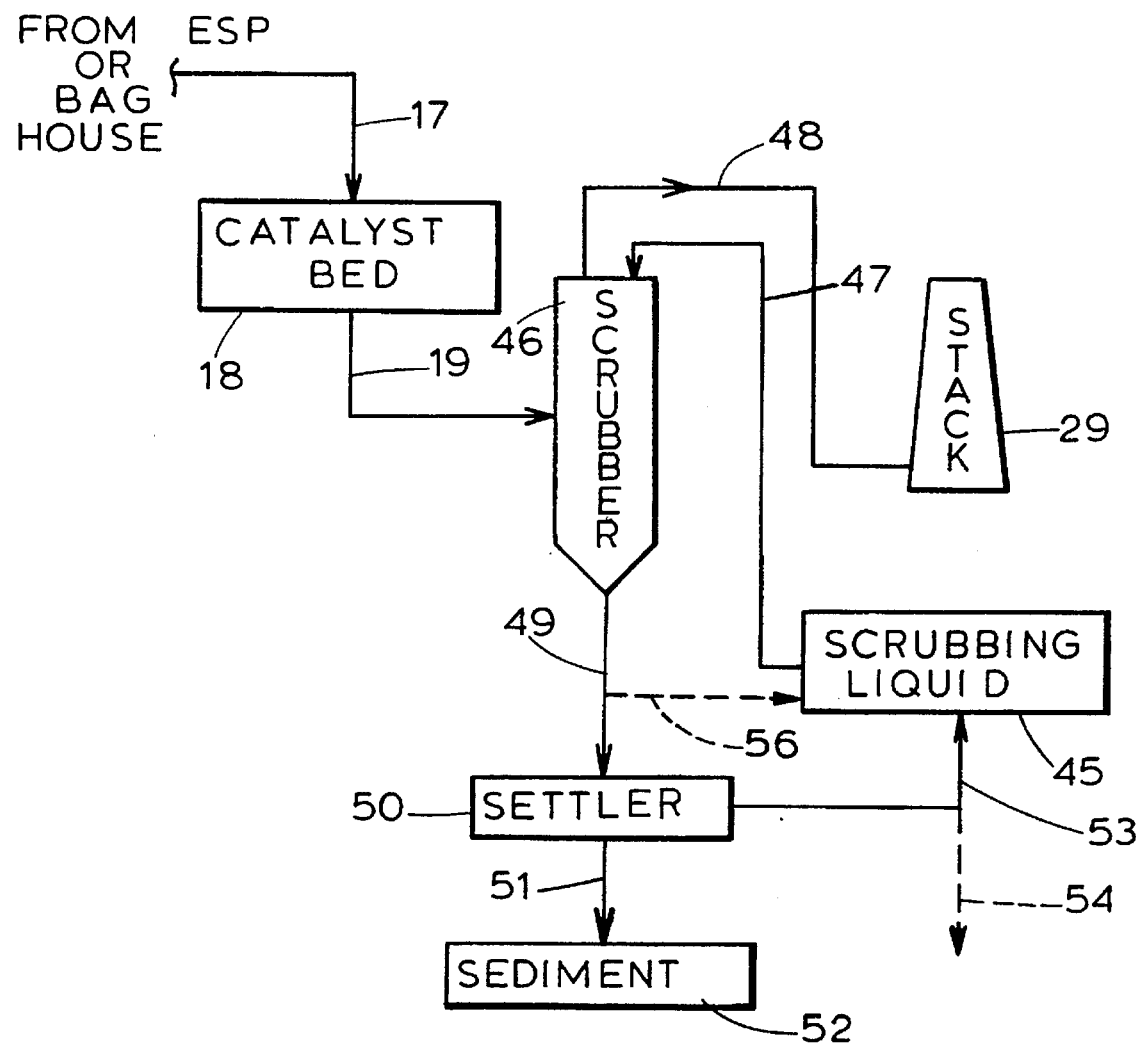
FIG. 2 is a flow diagram illustrating another embodiment of the present invention.

Referring now to FIG. 2, there is shown another embodiment of a method and apparatus in accordance with the present invention, for removing, from a stream of combustion gas, elemental mercury and mercury compounds contained in the gas, before releasing the gas stream into the atmosphere through the exhaust stack of the combustion system. Located upstream of stack 29 is a catalyzing station or bed 18 connected to a conduit or line 17 for conducting a combustion gas stream from a particle removal station, such as a bag house or an electrostatic precipitator 13, located upstream of catalyzing station 18 (FIG. 1). After particulate material has been removed from the gas stream, the gas stream is flowed through catalyzing station 18; this procedure catalytically promotes the oxidation of at least a major portion of the elemental mercury entering the catalyzing station. Oxidation produces, from the elemental mercury, at least one compound of mercury, typically mercuric chloride, which is relatively soluble in an aqueous liquid.

Located downstream of catalyzing station 18 is a mercury compound removal station, in this embodiment a scrubber or scrubbing station 46 connected to catalyzing station 18 through a line or conduit 19. The gas stream exiting catalyzing station 18 is flowed through scrubbing station 46, and this removes at least a major part of the mercury compounds from the gas stream. The gas stream exits scrubbing station 46 through a line 48 which conducts the gas stream to exhaust stack 29 from which the gas stream is released into the atmosphere outside the combustion system.

The combustion gas stream flowing through scrubbing station 46 contains acids (or oxidic precursors of acids) formed from the combustion reaction at boiler 10 (FIG. 1). An alkaline, aqueous scrubbing liquid, from a scrubbing liquid source 45, is directed through a line 47 into scrubber 46 to neutralize the acids introduced into the scrubbing station by the combustion gas stream entering through line 19. The scrubbing procedure performed at scrubbing station 46 also removes the soluble mercury compounds from the combustion gas stream.

Spent scrubbing material is generated at scrubbing station 46, as a result of the scrubbing procedure. The spent scrubbing material comprises an aqueous liquid containing alkaline salts of the neutralized acids from the combustion gas stream, and these salts are compounds without mercury.

Also contained in the aqueous liquid of the spent scrubbing material are the relatively soluble mercury compounds (e.g. mercuric chloride) removed from the gas stream by the scrubbing procedure. At least a major part of the mercury compounds contained in the spent scrubbing material is dissolved in the aqueous liquid of the spent scrubbing material.

The spent scrubbing material is conducted from scrubbing station 46 through a line 49 to a separating station or settler 50 which may be a settling pond, for example. Some of the spent scrubbing material may be recycled, via line 56, as part of scrubbing liquid 45 directed into scrubbing station 46.

The scrubbing procedure conducted at scrubbing station 46 removes, from the gas stream, at least a major part of the mercury compounds in the gas stream, but the scrubbing procedure is incapable of removing elemental mercury to any substantial extent. Accordingly, in order to assure the removal of substantially all the mercury from the gas stream at scrubbing station 46, it is important that the gas stream be subjected to the catalytic promotion of oxidation of the elemental mercury, upstream of scrubbing station 46, at catalyzing station 18.

The scrubbing liquid introduced into scrubbing station 46 from scrubbing liquid source 45 is an aqueous liquid containing an alkaline material such as limestone (calcium carbonate) as the neutralizing agent. Other neutralizing agents include sodium carbonate and sodium hydroxide. Sodium hydroxide and sodium carbonate are soluble in water whereas the calcium carbonate is substantially insoluble and is carried in the scrubbing liquid in finely divided form as a suspension or slurry.

The alkaline materials described in the preceding paragraph are the chemicals normally employed to neutralize the acids from the combustion gas stream. More particularly, the combustion reaction products from boiler 10 include oxides of nitrogen and sulfur ($NO_x$, $SO_2$ and $SO_3$) which can react with $H_2O$ in the gas stream or $H_2O$ from the aqueous scrubbing liquid to form nitric acid, sulfurous acid and sulfuric acid respectively. The sulfurous and sulfuric acids are neutralized at scrubber 46 to form sulfites and sulfates, with the sulfites being oxidized to sulfates fairly quickly. The chemicals normally contained in the scrubbing liquid, both before and after the neutralizing reaction, are incapable of chemically converting elemental mercury in the gas stream into a mercury compound; and the present invention does not require the addition of any such chemicals to the scrubbing liquid in order to remove elemental mercury from the gas stream.

The spent scrubbing material exiting scrubbing station 46 through line 49 contains mercury compounds dissolved therein, in relatively trace amounts compared to the relatively huge amounts of sulfate contained in the spent scrubbing material. The spent scrubbing material also contains unreacted neutralizing agent, such as calcium carbonate.

The mercury compounds in the spent scrubbing material are principally mercuric chloride and possibly an oxide or a sulfate of mercury. In any event, whatever the mercury compound present in the spent scrubbing material, it is essentially all dissolved therein.

In addition to oxides of sulfur, the combustion gas stream entering scrubbing station 46 may contain, as a combustion reaction product, an oxide of selenium. The oxides of sulfur and the oxide of selenium are compounds without mercury, and they each contain an element (sulfur, selenium) that has been removed from the gas stream by the scrubbing procedure and incorporated into the spent scrubbing material.

Referring now to separating station 50, the mercury compound and the compounds without mercury (e.g. calcium sulfate and selenium oxide) are separated from the spent scrubbing material by settling (indicated representationally by arrow 51) to form a sediment 52 containing these compounds. Separation of the compounds from the spent scrubbing material is promoted by adding a settling or floccing agent (e.g. alum) to the spent scrubbing material directed to separating station 50. Sediment 52 contains relatively huge amounts of compounds (such as alkaline sulfates) without mercury and relatively trace amounts of mercury compounds substantially all of which are soluble in aqueous liquids.

Sediment 52 typically is covered by aqueous liquid from the spent scrubbing material out of which the compounds in sediment 52 were separated. Separation reduces substantially the concentration of these compounds in the aqueous liquid at separating station 50. At least some of the aqueous liquid at separating station 50 is recirculated through a line 53 for inclusion in scrubbing liquid 45, after the aqueous liquid at separating station 50 has been subjected to the separating procedure.

As a result of having been subjected to a separating procedure at separating station 50, the aqueous liquid recirculated therefrom has not only a lower concentration of compounds without mercury, but also it has a lower concentration of mercury compounds than the spent scrubbing material exiting scrubbing station 46 through line 49. Nevertheless, there may still be a very small trace amount of mercury compounds dissolved in the recirculated aqueous liquid, and recirculating that aqueous liquid for scrubbing purposes prevents that very small trace amount of soluble mercury compounds from entering the environment outside of the system shown in FIG. 2. Unrecirculated aqueous liquid may be removed from separating station 50 through a line 54.

As noted above, there also are trace amounts of settled mercury compounds in sediment 52. These mercury compounds are soluble in an aqueous liquid, and it is therefore undesirable for these mercury compounds to enter the environment outside the system shown in FIG. 2. In accordance with the present invention, these relatively soluble mercury compounds in sediment 52 are converted to a relatively insoluble mercury compound, employing as the source of the anion of the insoluble mercury compound, one of the elements removed from the gas stream by the scrubbing step, namely sulfur or selenium. This is accomplished by subjecting sediment 52 to anoxic conditions. As a result, oxygen is extracted from the alkaline sulfate in sediment 52 and/or from the selenium oxide in sediment 52. This frees up, for reaction with the mercury compound in sediment 52, a sulfide ion or a selenide ion. Mercury forms a strong bond with sulfur, and the sulfide of mercury is very insoluble. Selenium forms an even stronger bond with mercury, and the selenide is also very insoluble.

Extraction of oxygen from the sulfates and selenides in sediment 52, and the reaction of the freed-up sulfide and selenide ions with mercury to form the insoluble mercury sulfide and selenide compounds is a slow process. In the confines of the sediment or sludge 52 in the settling pond at separating station 50, the ingredients are present to tie up the mercury in an insoluble form in the long run, and they are present in substantial molar excess relative to mercury. The process of extracting oxygen from the alkaline sulfate and the selenium oxide, under anoxic conditions, can employ algae and/or anaerobic bacteria in the settling pond. Anoxic conditions exist not only in sediment 52, but may also exist in that part of the overlying aqueous liquid immediately adjacent sediment 52. Hydrogen sulfide may also be present as a result of the reactions occurring under anoxic conditions in the sludge of the settling pond, and the hydrogen sulfide can also be a source of sulfide ion for reaction with mercury in the mercury compounds in sediment 52.

As noted above, the sulfur and selenium in the combustion gas stream and in sediment 52 are in substantial molar excess to the mercury in the gas stream and in the sediment. These molar excesses favor the formation of a sulfide and a selenide of mercury. As previously noted, the sulfide and the selenide of mercury are insoluble, and the bonds between (i) mercury and (ii) sulfur or selenium, in mercury sulfide and mercury selenide, are very strong. As a result, when mercury is combined as a selenide or sulfide, it can be released into the environment without the danger of environmental contamination, a danger which would be present if mercury were released into the environment as a soluble compound (e.g. as mercury chloride or mercury sulfate).

The scrubber employed at scrubbing station 46 may be any of the two main types of scrubbers currently employed for neutralizing acids from the combustion gas stream, i.e. venturi-type scrubbers and spray chambers. A falling film scrubber, with the gas and liquid falling in parallel in a narrow space may also be employed at scrubbing station 46.

Catalyzing station 18 should be downstream of the electrostatic precipitator or bag house at 13 (FIG. 1), to minimize the loss of mercury compounds to the environment. This is because mercury compounds can settle on the dust particles collected at 13 and will then be removed with these particles. Mercury compounds removed with dust particles collected at 13 can be lost to the environment when one disposes of the dust collected there. In contrast, elemental mercury in the gas stream flowing through the electrostatic precipitator or bag house at 13 will not be removed with the dust collected there. Deferring catalyzation until the gas stream is downstream of particle removal station 13 minimizes the amount of mercury compounds in the gas stream at 13, thereby reducing the amount of mercury compounds which can settle on and be removed with dust particles collected at 13.

The foregoing detailed description has been given for clearness of understanding only, and no unnecessary limitations should be understood therefrom, as modifications will be obvious to those skilled in the art. For example, the invention is not limited to the removal of mercury and mercury compounds from the combustion gas stream of a coal-burning power plant; the invention can be employed on other gas streams from which it is desirable to remove mercury and mercury compounds, e.g. the gas stream from a sewage sludge drying or combustion plant or from a garbage or refuse combustion plant or from an industrial waste combustion plant or from petroleum or natural gas combustion plants. As used herein, reference to a combustion gas stream includes any gas stream from which it is desirable to remove mercury.

I claim:

1. A method for removing, from a stream of combustion gas flowing into the stack of a combustion system, elemental mercury and mercury compounds contained in said gas, said method comprising the steps of:

flowing a stream of combustion gas containing elemental mercury and mercury compounds downstream toward a combustion system stack;

oxidizing the elemental mercury contained in said combustion gas, upstream of said stack, either with or without supplemental oxidizing, to produce therefrom at least one compound of mercury;

providing a mass of adsorbent particles each having a surface substantially the totality of which is relatively adsorbent to said previously-recited mercury compounds and relatively non-adsorbent to said elemental mercury;

directing said stream into said mass;

adsorbing, on said surfaces of said mass of adsorbent particles, said previously-recited mercury compounds;

and then releasing the combustion gas stream into the atmosphere outside said combustion system, after the performance of said adsorbing step;

said adsorbent particles (i) having a catalytic activity for the oxidation of mercury, at least substantially comparable to that of activated alumina particles and (ii) being sufficiently heat-resistant to accommodate a regeneration process for removing the adsorbed mercury compounds therefrom by heating above the decomposition temperature of said mercury compounds and above the vaporization temperature of mercury to drive off the mercury-containing materials adsorbed on said mass of adsorbent particles.

2. A method as recited in claim 1 wherein:

said oxidizing step comprises supplemental oxidizing of said elemental mercury.

3. A method as recited in claims 1 or 2 wherein:

said adsorbent particles have a surface to mass ratio of at least 175 $m^2/g$.

4. A method as recited in claim 3 wherein:

said surface to mass ratio is in the range of about 200 to about 600 $m^2/g$.

5. A method as recited in claims 1 or 2 wherein:

said particles are heat-resistant to a temperature greater than 600° C.

6. A method as recited in claim 5 wherein:

said particles are heat-resistant to a temperature greater than 700° C.

7. A method as recited in claims 1 or 2 wherein:

said adsorbing step is conducted at a temperature below that at which said mercury compounds decompose.

8. A method as recited in claims 1 or 2 wherein:

said adsorbing step is conducted at a temperature greater than 100° C.

9. A method as recited in claim 8 wherein:

said adsorbing step is conducted at a temperature in the range of about 150° to about 200° C.

10. A method as recited in claim 8 wherein:

said oxidizing step is conducted at a temperature in the range of about 150° to about 200° C.

11. A method as recited in claims 1 or 2 and comprising:

employing a catalyst to promote said oxidizing step.

12. A method as recited in claim 11 wherein:

said oxidizing step is enhanced by said mass of adsorbent particles.

13. A method as recited in claim 11 wherein:

at least some of said catalyst is combined with said mass of adsorbent particles.

14. A method as recited in claim 11 wherein said combustion gas is the product of a combustion reaction involving a combustion fuel and wherein:

said catalyst is employed upstream of said mass of adsorbent particles and downstream of said combustion reaction.

15. A method as recited in claim 11 wherein:

at least some of said catalyst is present in said combustion gas as a carry-over from the reaction involving said combustion fuel.

16. A method as recited in claims 1 or 2 wherein said combustion gas contains acids and said method further comprises:

incorporating, into said mass of adsorbent particles, an agent comprising at least one of the carbonates and hydroxides of sodium, potassium and calcium, for treating the acids in said combustion gas.

17. A method as recited in claims 1 or 2 wherein:

said adsorbent particles are composed of at least one of alumina, silica, magnesia, activated clays and combinations thereof.

18. A method as recited in claim 17 wherein:

said adsorbent particles are composed of activated alumina.

19. A method as recited in claim 18 wherein:

said adsorbing step is conducted in the absence of elemental sulfur.

20. A method as recited in claim 18 wherein:

said activated alumina particles have an average particle size in the range of about 8 to 14 mesh (1.41–2.38 mm).

21. A method as recited in claims 1 or 2 and further comprising the steps of:

heating a mass of said adsorbent particles, after a substantial quantity of mercury compounds have been adsorbed thereon, to an elevated temperature above the vaporization temperature of said adsorbed mercury compounds;

and employing said heating step to drive off, from said adsorbent particles, the resulting mercury-containing vapors;

thereby producing, as a result of said previously-recited steps, a mass of regenerated adsorbent particles capable of re-use to adsorb an additional substantial quantity of mercury compounds.

22. A method as recited in claim 21 wherein:

said elevated temperature is above the decomposition temperature of said adsorbed mercury compounds.

23. A method as recited in claim 22 wherein:

said heating step is performed at a temperature above about 600° C.

24. A method as recited in claim 22 wherein:

said heating step is performed at a temperature above about 700° C.

25. A method as recited in claim 22 wherein:

said heating step is performed at a temperature which produces elemental mercury vapor and drives off said elemental mercury vapor from said adsorbent particles;

said method further comprising the step of condensing said elemental mercury vapor which has been driven off from said adsorbent particles, at a location displaced from the mass of adsorbent particles undergoing regeneration.

26. A method as recited in claim 21 and further comprising:

adsorbing, on said mass of regenerated adsorbent particles, said previous-recited mercury compounds.

27. A method as recited in claim 21 wherein:

said heating step comprises driving off the adsorbed mercury compounds as elemental mercury vapor;

and said method comprises capturing said elemental mercury vapors and collecting elemental mercury therefrom in a liquid, highly concentrated form.

28. A method as recited in claims 1 or 2 and comprising:

catalyzing said oxidizing step with a catalyst carried over from the combustion fuel;

and employing as an oxidizing agent for performing said oxidizing step, at least one of (a) a combustion reaction product and (b) a compound injected into said gas stream to help remove fly ash.

29. A method as recited in claim 28 wherein:

said combustion reaction product employed as an oxidizing agent comprises at least one of hydrochloric acid, sulfuric acid, nitric acid, sulfur trioxide and nitrogen oxides.

30. A method as recited in claim 28 wherein:

said carry over catalyst comprises at least one of the oxides of manganese, vanadium, lead, chromium, iron, cobalt, nickel and selenium.

31. An apparatus for removing, from a stream of combustion gas flowing into the stack of a combustion system, elemental mercury and mercury compounds contained in said stream, said apparatus comprising:

means for enabling the oxidation, upstream of said stack, of elemental mercury contained in said stream, to produce a mercury compound;

a bed located upstream of said stack, said bed comprising a mass of adsorbent particles each having a surface substantially the totality of which is relatively adsorbent to said previously-recited mercury compounds and relatively non-adsorbent to said elemental mercury;

means for directing said stream through said bed;

said mass of adsorbent particles comprising means for adsorbing on said surfaces said previously-recited mercury compounds;

and means for releasing said stream into the atmosphere outside said combustion system, after said stream has passed through said bed;

said adsorbent particles (i) having a catalytic activity for the oxidation of mercury, at least substantially comparable to that of activated alumina particles and (ii) being sufficiently heat-resistant to accommodate a regeneration process for removing the adsorbed mercury compounds therefrom by heating above the decomposition temperature of said mercury compounds and above the vaporization temperature of mercury to drive off the mercury-containing materials adsorbed on said mass of adsorbent particles.

32. An apparatus as recited in claim 31 and comprising:

means in said bed for catalyzing the oxidation of said elemental mercury.

33. An apparatus as recited in claim 31 and comprising:

means, located upstream of said bed, for catalyzing the oxidation of said elemental mercury.

34. An apparatus as recited in claim 31 wherein:

said bed also includes means comprising at least one of the carbonates and hydroxides of sodium, potassium and calcium, for treating acids in said gas stream.

35. An apparatus as recited in claim 31 and comprising:

means for effecting supplemental oxidation of said elemental mercury, at a location upstream of said stack and no further downstream than said bed.

36. An apparatus as recited in claim 31 and comprising:

means for heating a mass of said adsorbent particles, after a substantial quantity of mercury compounds have been adsorbed thereon, to an elevated temperature at which elemental mercury vapor forms;

said heating means comprising means for driving off said elemental mercury vapor from said adsorbent particles;

means for condensing elemental mercury vapor, at a location displaced from said heating means;

means for directing, to said condensing means, mercury vapor which has been driven off from said adsorbent particles at said heating means;

and means, including said heating means and said condensing means, for regenerating said adsorbent particles for re-use in the removal of mercury compounds contained in said stream of combustion gas.

37. An apparatus as recited in claim 36 wherein:

said heating means is at a location displaced from said bed;

and said apparatus comprises means for transporting regenerated particles from said heating means to said bed.

38. A method for removing, from a stream of combustion gas flowing into the exhaust stack of a combustion system, elemental mercury and mercury compounds contained in said gas, said method comprising the steps of:

flowing a stream of combustion gas containing elemental mercury and mercury compounds downstream toward a combustion system stack;

flowing said gas stream through a catalyzing station located upstream of said stack;

catalytically promoting the oxidation of at least a major portion of said elemental mercury entering said catalyzing station, in response to the flowing of said gas stream through said catalyzing station, to produce, from said elemental mercury, at least one compound of mercury;

flowing said gas stream through a mercury compound removal station located downstream of said catalyzing station;

removing at least a major part of said previously recited mercury compounds from said gas stream in response to the flowing of said gas stream through said removal station;

and then releasing the combustion gas stream into the atmosphere outside said combustion system, through said stack, after said removing step.

39. A method as recited in claim 38 wherein said combustion gas stream at said removal station contains acids formed as a result of the combustion reaction, said method further comprising:

neutralizing said acids at said removal station.

40. A method as recited in claim 38 wherein said combustion gas stream contains particulate material, said method further comprising:

removing said particulate material at a particle removal station located upstream of said catalyzing station.

41. A method as recited in claim 38 wherein:

said step of removing said mercury compounds employs a procedure which (a) removes at least a major part of the mercury compounds in said gas stream but (b) is incapable of removing elemental mercury to any substantial extent.

42. A method as recited in claim 41 wherein said combustion gas steam at said removal station contains acids formed as a result of the combustion reaction, said method comprising:

scrubbing said gas stream with an alkaline aqueous scrubbing liquid, to neutralize said acids, at a scrubbing station located downstream of said catalyzing station;

the procedure employed for removing said mercury compounds comprising said scrubbing step.

43. A method as recited in claim 42 wherein:

said scrubbing step is performed without including in said scrubbing liquid any chemicals other than those normally employed for neutralizing the acids from said combustion gas stream;

said scrubbing liquid being incapable of chemically converting elemental mercury into a mercury compound;

said method being performed without the addition to said scrubbing liquid of a chemical for converting elemental mercury to a mercury compound, to any substantial extent.

44. A method as recited in claim 42 and comprising:

generating spent scrubbing material at said scrubbing station, said spent scrubbing material comprising an aqueous liquid containing a compound without mercury and a relatively soluble mercury compound removed from the gas stream by said scrubbing step, at least a major part of said mercury compound contained in said spent scrubbing material being dissolved therein;

said compound without mercury containing at least one element removed from said gas stream by said scrubbing step;

conducting said spent scrubbing material from said scrubbing station to a separating station;

separating said compound without mercury and said mercury compound from said spent scrubbing material, at said separating station, by settling;

forming a sediment at said separating station, said sediment containing said compounds separated from the spent scrubbing material;

providing an aqueous liquid over said sediment;

and converting at least some of the relatively soluble mercury compound in said sediment to a relatively insoluble mercury compound, employing said one element as the source of the anion in said compound.

45. A method as recited in claim 44 wherein said gas stream contains selenium oxide, said method further comprising:

employing said scrubbing step to remove said selenium oxide from said gas stream and to incorporate it into said spent scrubbing material;

employing said settling step to separate said selenium oxide from the spent scrubbing material, and to incorporate it into said sediment;

subjecting said sediment to anoxic conditions;

extracting oxygen from the selenium oxide in said sediment, as a result of said anoxic conditions;

and converting at least some of the relatively soluble mercury compounds in said sediment to relatively insoluble mercury selenide, employing, as the source of the selenium ion, selenium oxide from which the oxygen has been extracted as a result of said anoxic conditions.

46. A method as recited in claim 44 wherein said gas stream entering said scrubbing station contains an oxide of sulfur or its acid or both, said method further comprising:

employing said scrubbing step to remove said oxide of sulfur and/or its acid from said gas stream and to incorporate it into said spent scrubbing material as a sulfate;

employing said settling step to separate said sulfate from the spent scrubbing material, and to incorporate it into said sediment;

subjecting said sediment to anoxic conditions;

extracting oxygen from said sulfate in said sediment as a result of said anoxic conditions;

and converting at least some of the relatively soluble mercury compound in said sediment to relatively insoluble mercury sulfide, employing as a source of the sulfide ion, the sulfate from which oxygen has been extracted as a result of said anoxic conditions.

47. A method as recited in any of claims 44 through 46 and comprising:

adding a settling or floccing agent to the spent scrubbing material conducted to said separating station, to promote the separation of said compounds from said spent scrubbing material.

48. A method as recited in any of claims 44 through 46 wherein:

said separating step comprises reducing the concentration of said compounds in said aqueous liquid, at said separating station;

and said method comprises recirculating at least some of said aqueous liquid from said separating station, for inclusion in said scrubbing liquid, after said aqueous liquid has been subjected to said separating step.

49. A method as recited in claim 41 wherein the procedure employed for removing said mercury compounds comprises:

providing a mass of adsorbent particles which (a) are adsorbent to said mercury compounds but (b) are not adsorbent to metallic mercury to any substantial extent;

directing said gas stream into said mass;

and adsorbing said mercury compounds on said mass of adsorbent particles;

said adsorbent particles (i) having an adsorbent capability for mercury compounds, at least substantially comparable to that of activated alumina particles and (ii) being sufficiently heat-resistant to accommodate a regenerating process for removing the adsorbed mercury compounds therefrom by heating above the decomposition temperature of said mercury compounds and above the vaporization temperature of mercury to drive off the mercury-containing materials adsorbed on said mass of adsorbent particles.

50. In a combustion system having an exhaust stack, an apparatus for removing, from a stream of combustion gas flowing into said stack, elemental mercury and mercury compounds contained in said gas, said apparatus comprising:

a catalyzing station located upstream of said stack;

means for flowing said gas stream through said catalyzing station;

said catalyzing station comprising means for catalytically promoting the oxidation of at least a major portion of said elemental mercury entering said catalyzing station, in response to the flowing of said gas stream through said catalyzing station, to produce, from said elemental mercury, at least one compound of mercury;

a mercury compound removal station located downstream of said catalyzing station;

means for flowing said gas stream through said removal station;

said removal station comprising means for removing at least a major part of said previously recited mercury compounds from said gas stream in response to the flowing of said gas stream through said removal station;

and means for releasing the combustion gas stream into the atmosphere outside said combustion system, through said stack, after said removing step.

51. In a combustion system as recited in claim 50 wherein said combustion gas stream at said removal station contains acids formed as a result of the combustion reaction, said apparatus further comprising:

means for neutralizing said acids at said removal station.

52. In a combustion system as recited in claim 50 wherein said combustion gas stream contains particulate material, said apparatus further comprising:

a particle removal station located upstream of said catalyzing station;

said particle removal station comprising means for removing said particulate material from said gas stream.

53. In a combustion system as recited in claim 50 wherein:

said means for removing said mercury compounds comprises means which (a) removes at least a major part of the mercury compounds in said gas stream but (b) is incapable of removing elemental mercury to any substantial extent.

54. In a combustion system as recited in claim 53 wherein said combustion gas stream at said removal station contains acids formed as a result of the combustion reaction, said apparatus comprising:

a scrubbing station located downstream of said catalyzing station;

said scrubbing station comprising means for scrubbing said gas stream with an alkaline scrubbing liquid, to neutralize said acid;

said means for removing said mercury compounds comprising said scrubbing means.

55. In a combustion system as recited in claim 34 wherein:

said scrubbing means comprises means for performing a scrubbing operation without including in said scrubbing liquid any chemicals other than those normally employed for neutralizing the acids in said combustion gas stream;

said scrubbing means comprising means for performing said scrubbing operation without chemically converting metallic mercury into a mercury compound.

56. In a combustion system as recited in claim 54 wherein:

said scrubbing means comprises means for generating spent scrubbing material at said scrubbing station;

and said apparatus comprises a separating station and means for conducting said spent scrubbing material from said scrubbing station to said separating station.

57. In a combustion system as recited in claim 56 wherein said spent scrubbing material comprises an aqueous liquid containing a compound without mercury and a relatively soluble mercury compound removed from the gas stream by said scrubbing means, at least a major part of said mercury compound contained in said spent scrubbing material being dissolved therein, said compound without mercury containing at least one element removed from said gas stream by said scrubbing means, and wherein said separating station comprises:

means for enabling the separation of (a) said compound without mercury and said mercury compound from (b) said spent scrubbing material, by settling;

means for enabling the formation of a sediment containing said compounds separated from the spent scrubbing material;

means for providing an aqueous liquid over said sediment;

and means for enabling the conversion of at least some of the relatively soluble mercury compound in said sediment to a relatively insoluble mercury compound, employing said one element as the source of the anion in said compound.

58. In a combustion system as recited in claim 57 wherein said gas stream contains selenium oxide, and wherein said apparatus further comprises:

means at said scrubbing station for removing said selenium oxide from said gas stream and for incorporating it into said spent scrubbing material.

59. In a combustion system as recited in claim 58 wherein said separating station comprises:

means for enabling (i) the separation of said selenium oxide from the spent scrubbing material, by settling, and (ii) the incorporation into said sediment of the separated selenium oxide;

means for enabling said sediment to be subjected to anoxic conditions;

means for enabling the extraction of oxygen from the selenium oxide in said sediment, as a result of said anoxic conditions;

and means for enabling the conversion of at least some of the relatively soluble mercury compounds in said sediment to relatively insoluble mercury selenide, employing, as the source of the selenium ion, selenium oxide from which the oxygen has been extracted as a result of said anoxic conditions.

60. In a combustion system as recited in claim 57 wherein said gas stream entering said scrubbing station contains an oxide of sulfur or its acid or both, and wherein said apparatus further comprises:

means at said scrubbing station for removing said oxide of sulfur and/or its acid from said gas stream and for incorporating it into said spent scrubbing material as a sulfate.

61. In a combustion system as recited in claim 60 wherein said separating station comprises:

means for enabling (i) the separation of said sulfate from the spent scrubbing material, by settling, and (ii) the incorporation into said sediment of the separated sulfate;

means for enabling said sediment to be subjected to anoxic conditions;

means for enabling the extraction of oxygen from said sulfate in said sediment as a result of said anoxic conditions;

and means for enabling the conversion of at least some of the relatively soluble mercury compound in said sediment to relatively insoluble mercury sulfide, employing as a source of the sulfide ion, the sulfate from which oxygen has been extracted as a result of said anoxic conditions.

62. In a combustion system as recited in any of claims 57 through 61 wherein said apparatus further comprises:

a location for adding a settling or floccing agent to the spent scrubbing material conducted to said separating station, to promote the separation of said compounds from said spent scrubbing material.

63. In a combustion system as recited in any of claims 57 through 61 wherein said separating station comprises:

means for enabling a reduction in the concentration of said compounds in said aqueous liquid, at said separating station;

and said apparatus comprises means for recirculating at least some of said aqueous liquid from said separating station, for inclusion in said scrubbing liquid, after there has been a reduction in the concentration of said compounds in said aqueous liquid.

64. In a combustion system as recited in claim 53 wherein said means for removing said mercury compounds comprises:

a mass of adsorbent particles which (a) are adsorbent to said mercury compounds but (b) are not adsorbent to metallic mercury to any substantial extent;

means for directing said gas stream into said mass;

said mass of adsorbent particles comprising means for adsorbing said mercury compounds thereon;

said adsorbent particles (i) having an adsorbent capability for mercury compounds, at least substantially comparable to that of activated alumina particles and (ii) being sufficiently heat-resistant to accommodate a regeneration process for removing the adsorbed mercury compounds therefrom by heating above the decomposition temperature of said mercury compounds and above the vaporization temperature of mercury to drive off the mercury-containing materials adsorbed on said mass of adsorbent particles.

\* \* \* \* \*

UNITED STATES PATENT AND TRADEMARK OFFICE
CERTIFICATE OF CORRECTION

PATENT NO. : 5,607,496

DATED : March 4, 1997

INVENTOR(S) : Richard J. Brooks

It is certified that error appears in the above-identified patent and that said Letters Patent is hereby corrected as shown below:

Title page,
<u>IN THE ABSTRACT</u>

Add at beginning of abstract: --Vapors of elemental mercury and mercury compounds contained--

Signed and Sealed this

Twenty-ninth Day of July, 1997

Attest:

BRUCE LEHMAN

Attesting Officer

Commissioner of Patents and Trademarks